(12) United States Patent
Hartlemeier

(10) Patent No.: US 7,980,780 B2
(45) Date of Patent: Jul. 19, 2011

(54) QUICK ACTION TURNBUCKLE

(75) Inventor: Greg W. Hartlemeier, Whitefish Bay, WI (US)

(73) Assignee: Harken, Inc., Pewaukee, WI (US)

( * ) Notice: Subject to any disclaimer, the term of this patent is extended or adjusted under 35 U.S.C. 154(b) by 708 days.

(21) Appl. No.: 11/964,176

(22) Filed: Dec. 26, 2007

(65) Prior Publication Data
US 2009/0169291 A1 Jul. 2, 2009

(51) Int. Cl.
*F16B 7/06* (2006.01)
*F16G 11/12* (2006.01)
*B63B 15/02* (2006.01)

(52) U.S. Cl. .......................................... 403/43; 114/109

(58) Field of Classification Search ............. 114/102.12, 114/102.22, 108, 109, 111; 403/43–48
See application file for complete search history.

(56) References Cited

U.S. PATENT DOCUMENTS

| | | | | |
|---|---|---|---|---|
| 2,538,757 A * | 1/1951 | Bratthauer et al. | ............. | 403/27 |
| 3,291,090 A * | 12/1966 | Sevey | ............. | 114/109 |
| 3,620,182 A * | 11/1971 | Russell | ............. | 114/109 |
| 4,672,908 A * | 6/1987 | Goulooze | ............. | 114/214 |
| 5,485,760 A * | 1/1996 | Lange | ............. | 74/89.25 |

* cited by examiner

*Primary Examiner* — Ajay Vasudeva
(74) *Attorney, Agent, or Firm* — Alan R. Stewart; Godfrey & Kahn

(57) ABSTRACT

An adjuster for use with a sailboat which permits rapid movement of a movable end with respect to an opposite fixed end. A threaded shaft extends through the adjuster and a rotating barrel in fixed to a nut engaging the shaft. A lock is positioned about a lower body of the adjuster and releasably engages the barrel. Engagement of the lock and the barrel permits barrel to be turned to change the length between the fixed and movable ends. Releasing engagement of the lock and the barrel permits the barrel to rotate freely about the shaft and permit rapid movement of the movable end with respect to the fixed end.

5 Claims, 12 Drawing Sheets

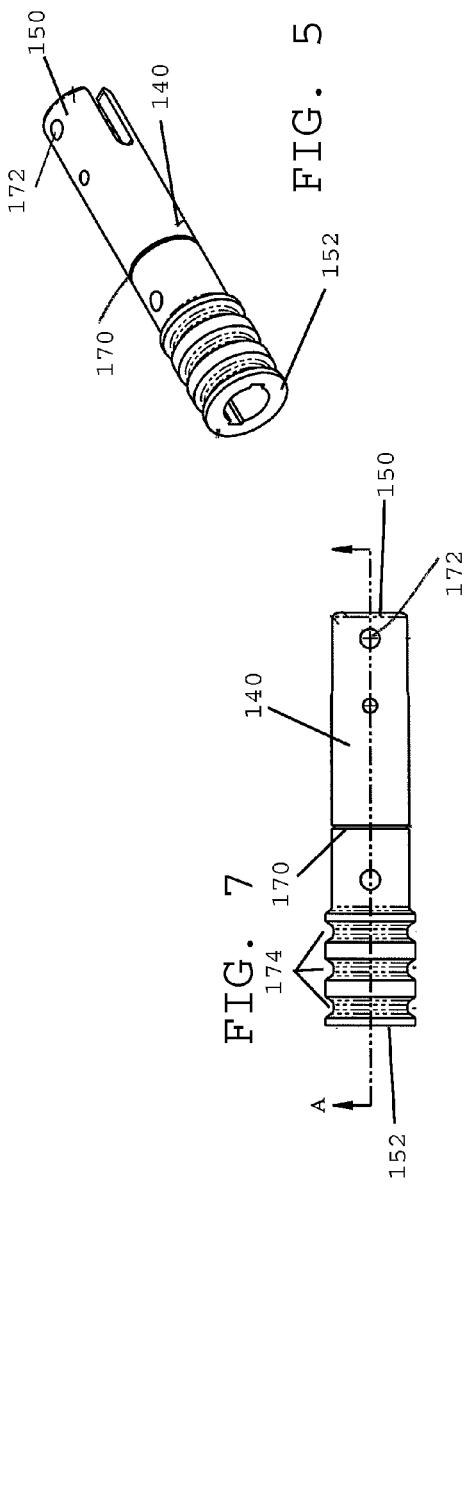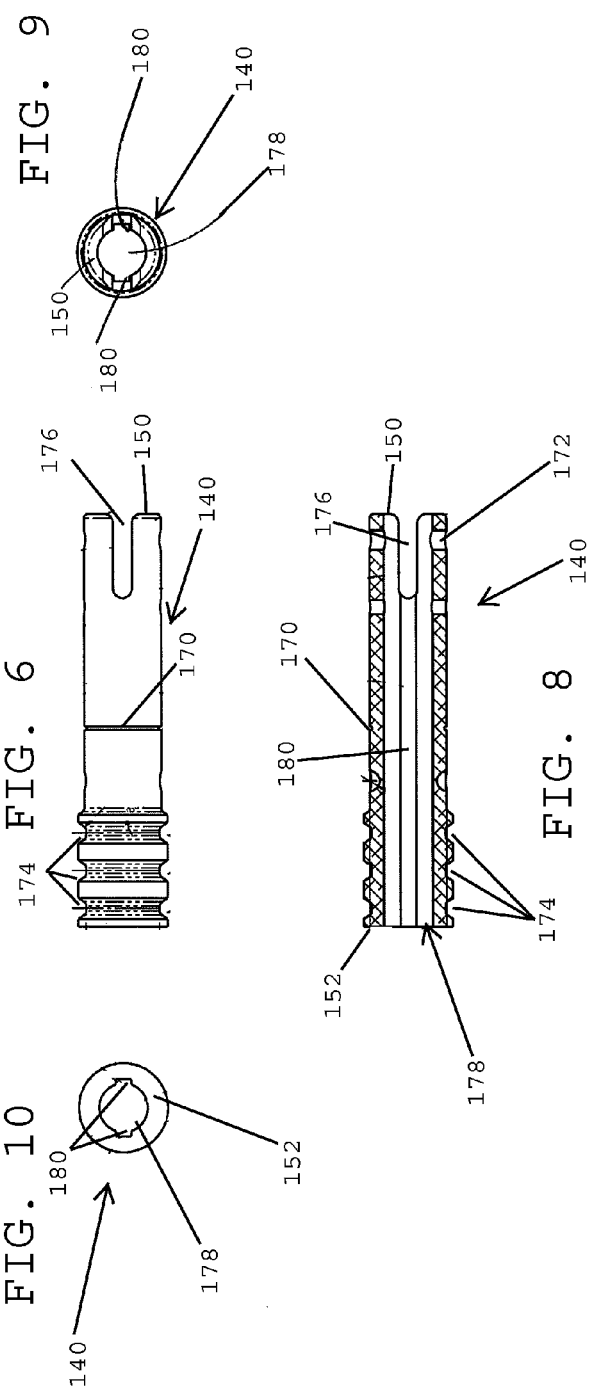

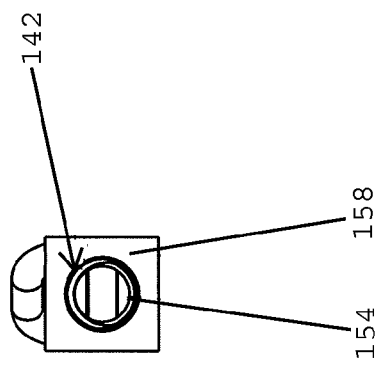
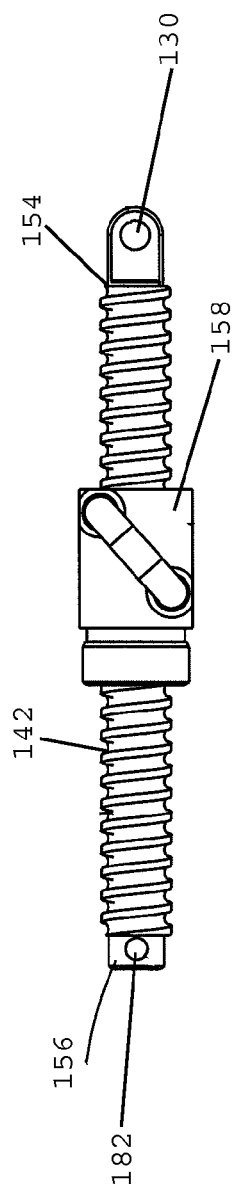
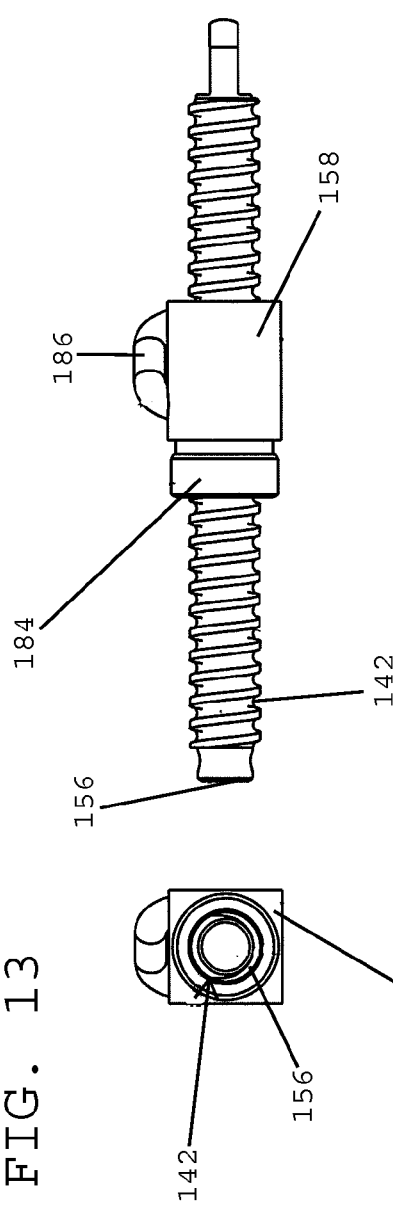
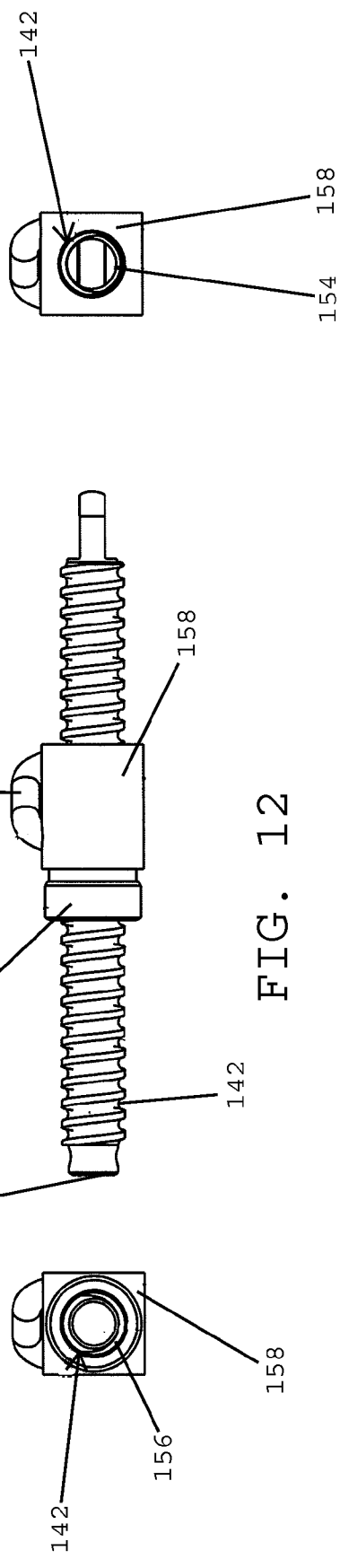

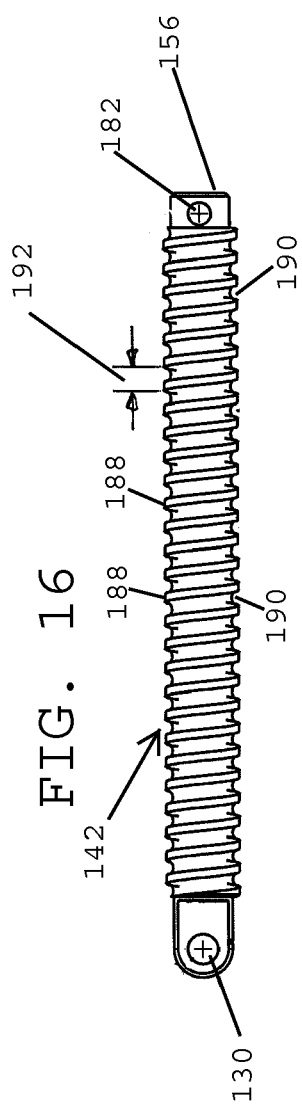
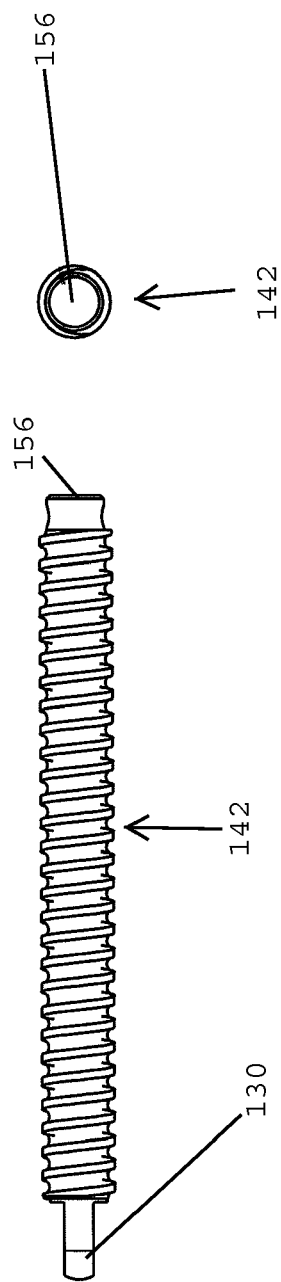
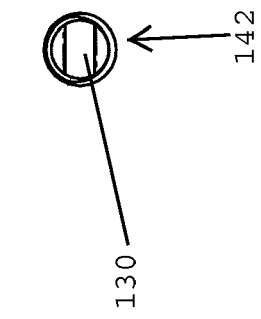
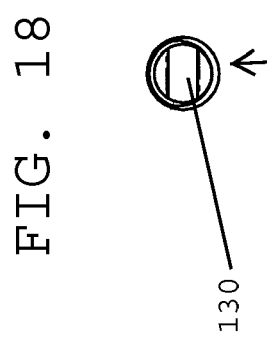

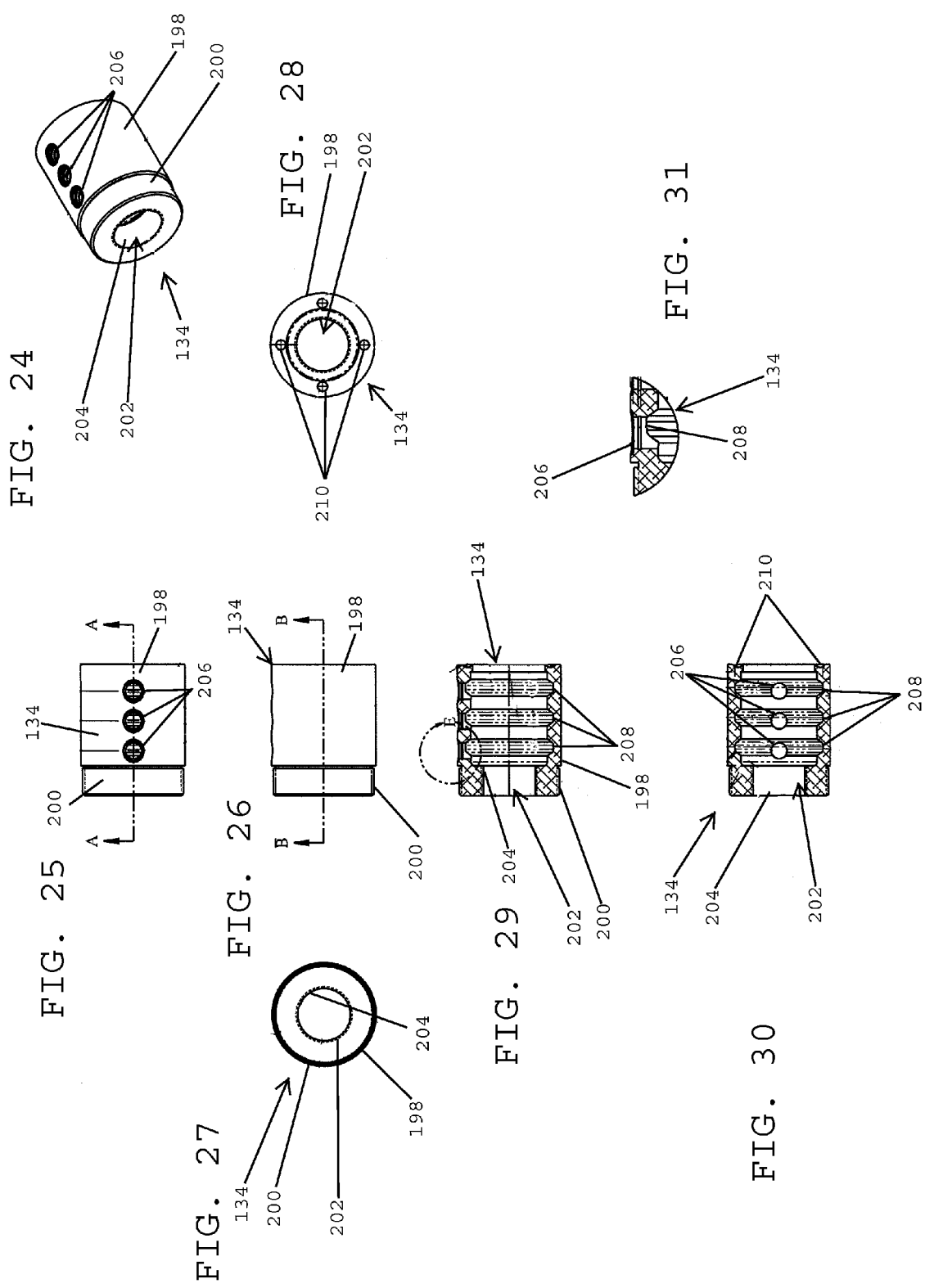

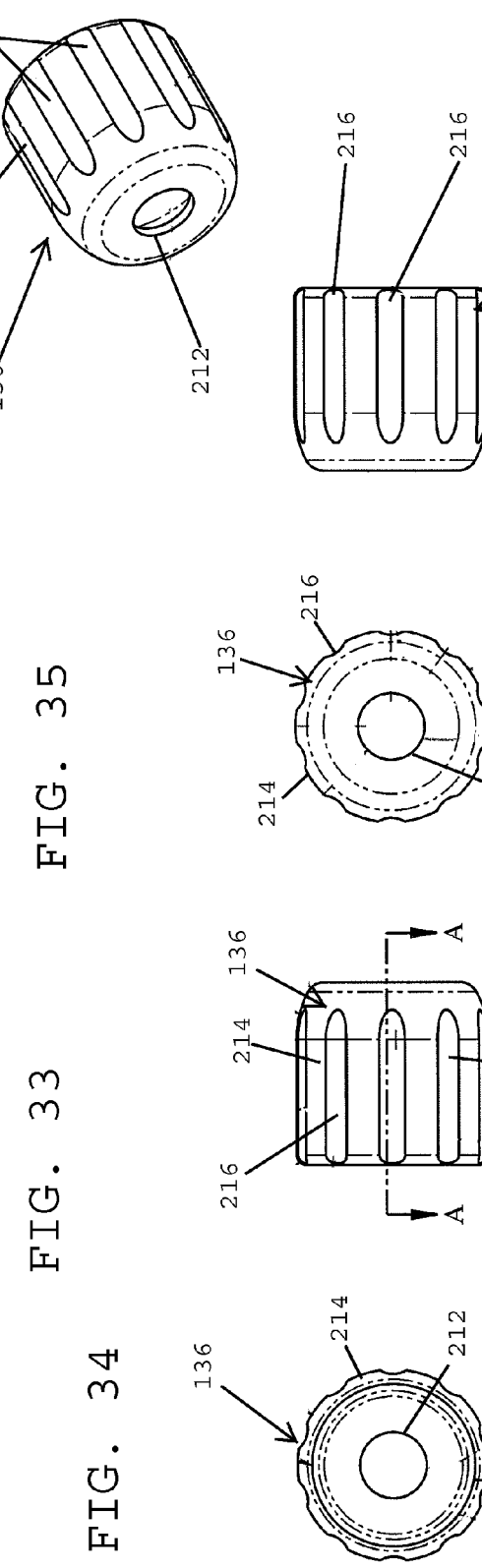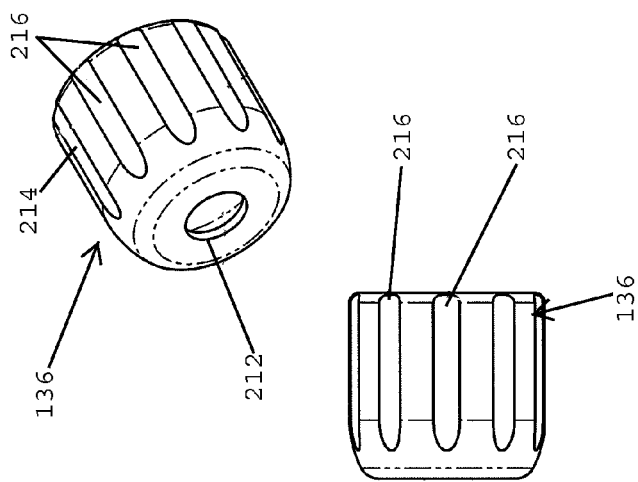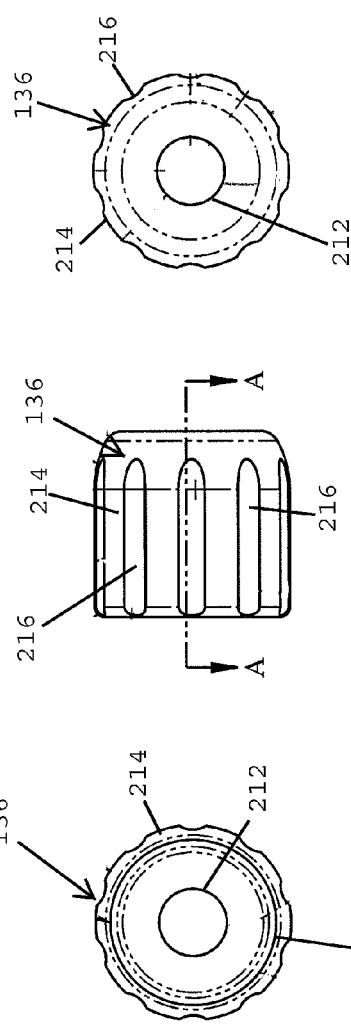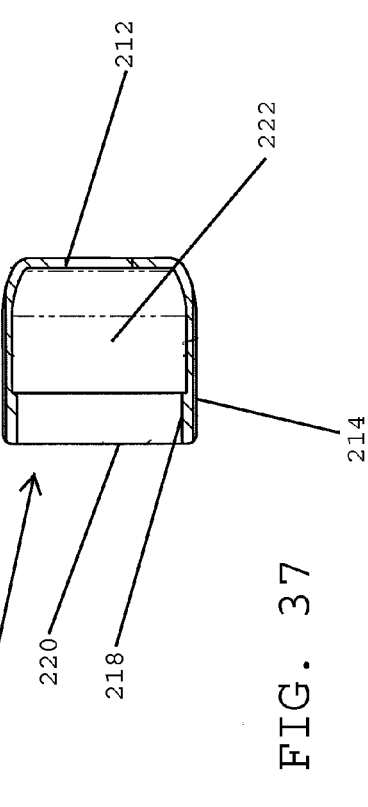

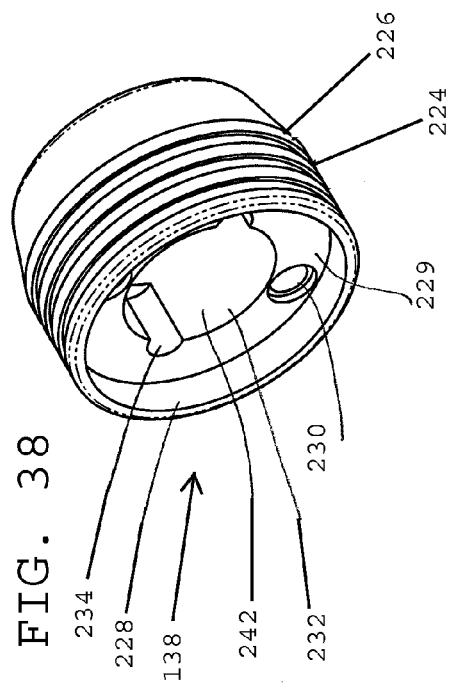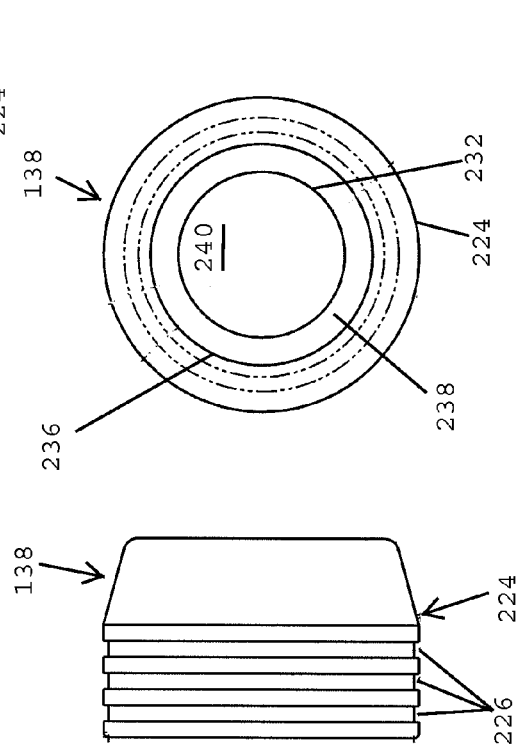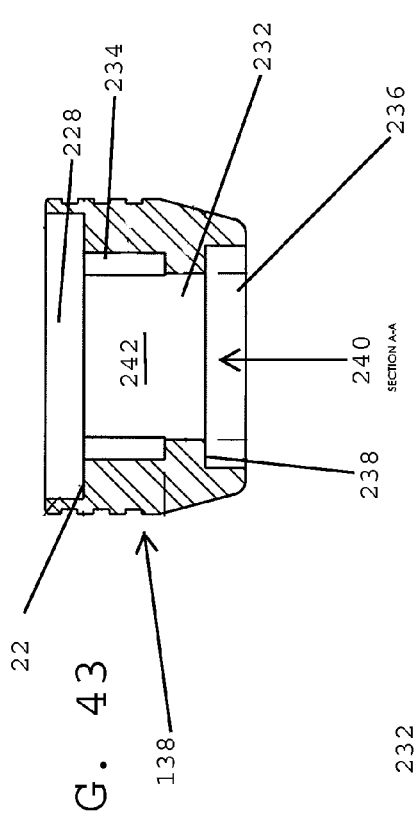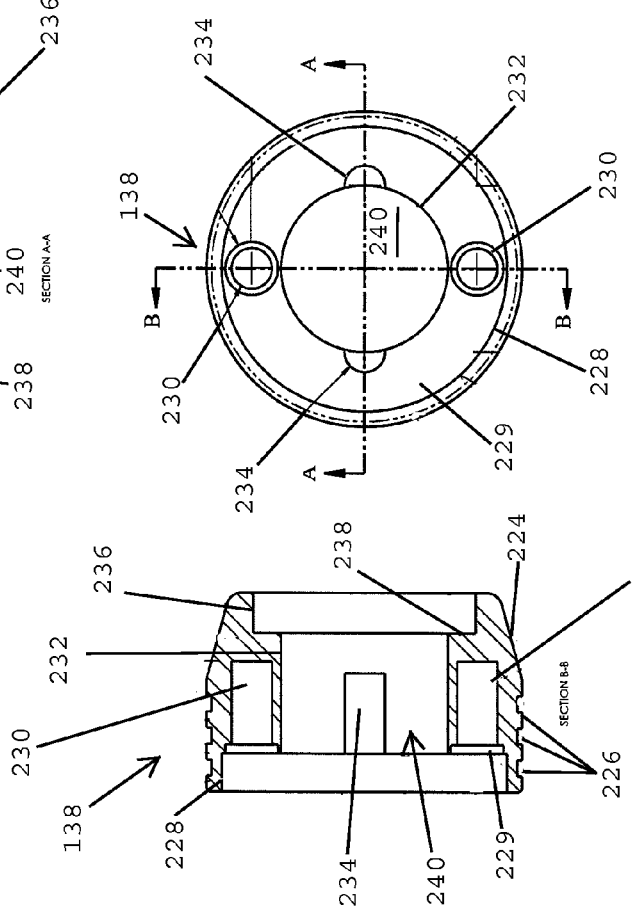

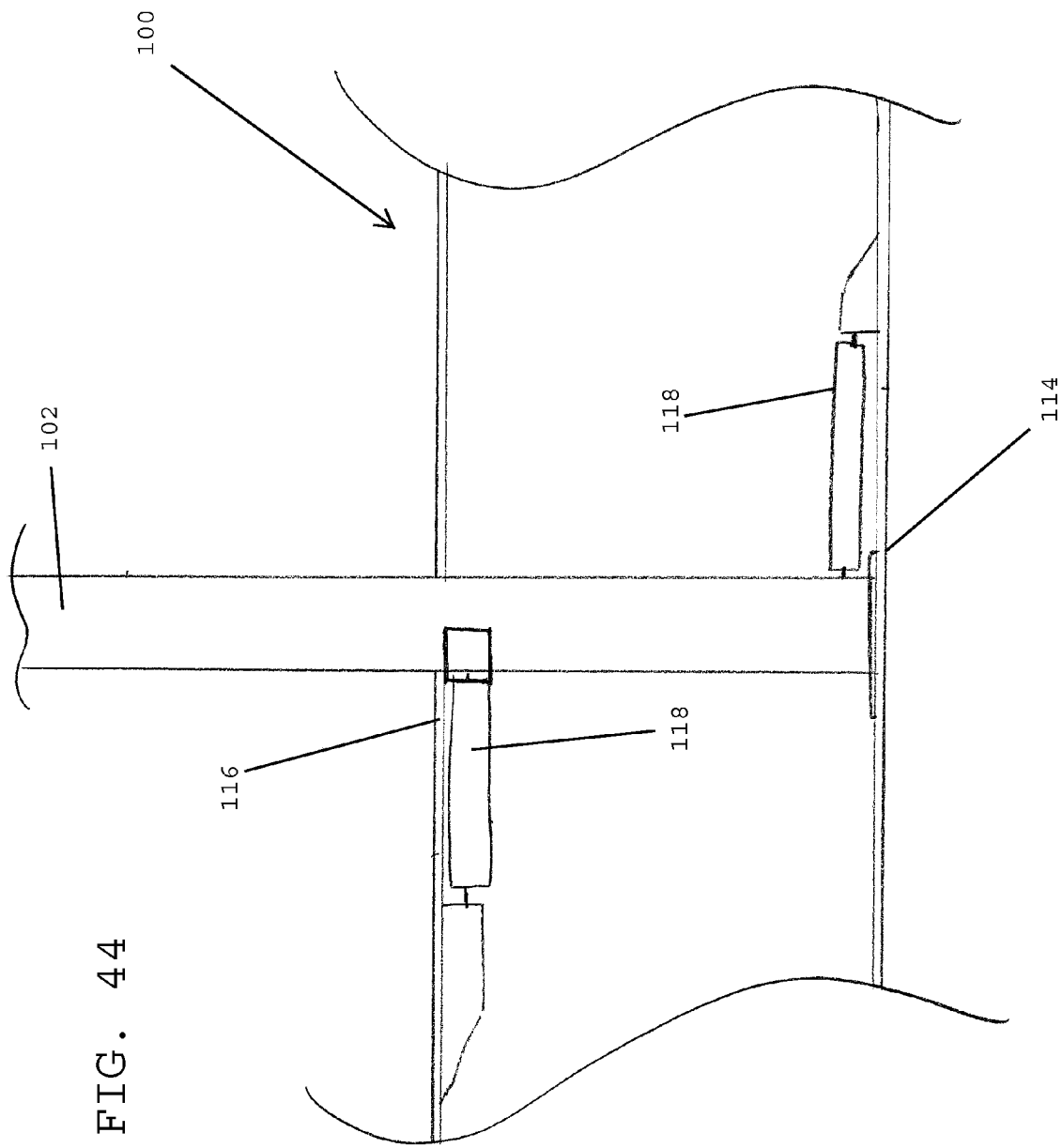

QUICK ACTION TURNBUCKLE

TECHNICAL FIELD

The present disclosure relates generally to tension or length adjusters for sailboats.

BACKGROUND

Adjustable turnbuckles for shrouds, stays or other standing rigging have been conventionally used on sailboats to permit the mast of the sailboat be positioned and adjusted as desired by the sailor. Stays providing the fore and aft support for a mast have been configured as adjustable during sailing by a variety of mechanical and/or hydraulic devices. Such devices allow precise control of the shape or bend of the mast and in reaction, the shape of the sail bent to the mast or to the stay.

However, for some classes or designs of sailboats, it may also be desirable to be able to change the overall position of the mast relative to the hull during a race. For such boats, the position of the mast may desirably be radically changed for upwind sailing versus downwind sailing. As a non-limiting example, a Yngling class keelboat includes a backstay adjustment to permit the adjustment of spar and sail shape. However, it is also desirable to have the mast move or rake forward in the boat during a race to permit the sails to be placed in a more optimal downwind position for a leeward leg as compared to a more optimal upwind position used for a windward leg.

To accomplish such a fore and aft raking of the mast, the stays providing lateral support to the mast are preferably also adjusted. Particularly for rigs with swept back spreaders or with side stays anchored to the hull behind the mast, to rake the mast forward, the effective length of the side stays must also be increased in conjunction an effective lengthening of the backstay. Conventional backstay length adjusters are well known and may provide for both mechanical advantage in shortening the effective length of the backstay and rapid action for increasing the effective length.

Conventional turnbuckles do permit alteration of the side stays to accomplish such fore and aft positioning or raking of the mast. However, the speed at which conventional turnbuckles permit changes to the position of the mast s not sufficient or convenient in most racing situations. Improvements to turnbuckles are desirable.

SUMMARY

The present disclosure relates to an adjuster for use with a sailboat which permits rapid movement of a movable end with respect to an opposite fixed end. A threaded shaft extends through the adjuster and a rotating barrel in fixed to a nut engaging the shaft. A lock is positioned about a lower body of the adjuster and releasably engages the barrel. Engagement of the lock and the barrel permits barrel to be turned to change the length between the fixed and movable ends. Releasing engagement of the lock and the barrel permits the barrel to rotate freely about the shaft and permit rapid movement of the movable end with respect to the fixed end.

BRIEF DESCRIPTION OF DRAWINGS

The accompanying drawings, which are incorporated in and constitute a part of the description, illustrate several aspects of the invention and together with the description, serve to explain the principles of the invention. A brief description of the drawings is as follows:

FIG. 5 is a perspective view of a lower body of the adjuster of FIG. 2.

FIG. 6 is a first side view of the lower body of FIG. 5.

FIG. 7 is a second side view of the lower body of FIG. 5.

FIG. 8 is a side cross-sectional view of the lower body of FIG. 5, taken along Line A-A of FIG. 7.

FIG. 9 is a first end view of the of the lower body of FIG. 5.

FIG. 10 is a second end view of the lower body of FIG. 5.

FIG. 11 is a first side view of a ball screw and nut assembly of the adjuster of FIG. 2.

FIG. 12 is a second side view of the assembly of FIG. 11.

FIG. 13 is a first end view of the assembly of FIG. 11.

FIG. 14 is a second end of the assembly of FIG. 11.

FIG. 16 is a first side view of the ball screw of the assembly of FIG. 11.

FIG. 17 is a second side view of the ball screw of FIG. 16.

FIG. 18 is a first end view of the ball screw of FIG. 16.

FIG. 19 is a second end view of the ball screw of FIG. 16.

FIG. 24 is a perspective view of a barrel of the adjuster of FIG. 2.

FIG. 25 is a first side view of the barrel of FIG. 24.

FIG. 26 is a second side view of the barrel of FIG. 24.

FIG. 27 is a first end view of the barrel of FIG. 24.

FIG. 28 is a second end view of the barrel of FIG. 24.

FIG. 29 is a first cross-section view of the barrel of FIG. 24, taken along Line A-A of FIG. 25.

FIG. 30 is a second side cross-sectional view of the barrel of FIG. 24, taken along Line B-B of FIG. 26.

FIG. 31 is an enlarged view of a portion of the barrel of FIG. 29 indicated by Circle E.

FIG. 32 is a perspective view of an upper grip of the adjuster of FIG. 2.

FIG. 33 is a first side view of the upper grip of FIG. 32.

FIG. 34 is a first end view of the upper grip of FIG. 32.

FIG. 35 is a second side view of the upper grip of FIG. 32.

FIG. 36 is a second end view of the upper grip of FIG. 32.

FIG. 37 is a side cross-sectional view of the upper grip of FIG. 32, taken along Line A-A of FIG. 33.

FIG. 38 is a perspective view of a sliding lock of the adjuster of FIG. 2.

FIG. 39 is a first end view of the lock of FIG. 38.

FIG. 40 is a side view of the lock of FIG. 38.

FIG. 41 is a second end view of the lock of FIG. 38.

FIG. 42 is a first cross-section view of the lock of FIG. 38, taken along Line A-A of FIG. 39.

FIG. 43 is a second cross-section view of the lock of FIG. 38, taken along Line B-B of FIG. 39.

FIG. 44 is a side view of alternative positioning of an adjuster according to the present disclosure to change position of a mast of the sailboat of FIG. 1.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
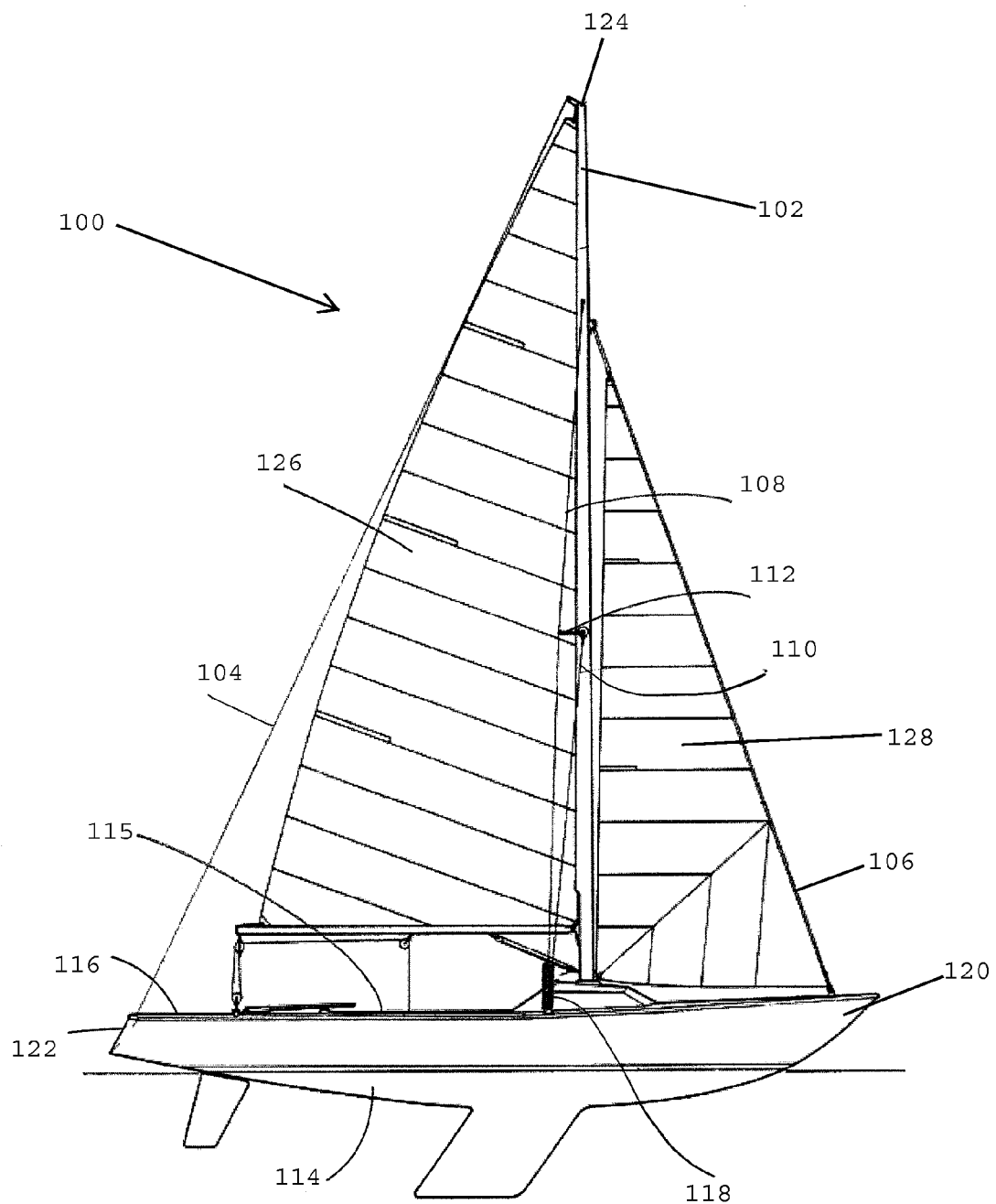
FIG. 1 is a side view of a sloop rigged sailboat showing the standing rigging supporting the mast and an adjuster according to the present disclosure included in the standing rigging.

Referring now to FIG. 1, a sailboat 100 includes a mast 102 which is supported by standing rigging. This standing rigging may include a backstay 104 and a forestay 106, an upper sidestay 108 and a lower sidestay 110. A spreader 112 may be included in the standing rigging as well. The standing rigging all connects to mast 102 at points above a hull 114 and a deck 116 of sailboat 100. The standing rigging cooperates to support mast 102 in a desired fore and aft position between a bow 120 and a stern 122 of hull 114 and in a desired side-to-side positioning with respect to a beam of hull 114. A cockpit 115 provides a location for the crew of sailboat 100 to operate the boat.

As shown, sidestays 108 and 110 are connected to deck 116 and hull 114 at a point astern of mast 102. Thus, sidestays 108 and 110 may be used to position mast 102 both fore and aft and side-to-side. Conventionally, turnbuckles or other adjustable mechanical arrangements would be used between the sidestays and the hull or deck to permit adjustment of the mast position be lengthening or shorting the sidestays. As shown in FIG. 1, a quick action adjuster or turnbuckle 118 is positioned between each sidestay 108, 110 and deck 116. Also included in sailboat 100 though not visible within hull 114 is a backstay adjuster between hull 114 and backstay 104 permitting backstay 104 to be quickly lengthened or shortened as desired during sailing.

As is well known in sailing, shortening or tensioning backstay 104 will tend to pull mast tip 124 rearward and induce a forward bend in mast 102. Such shortening of backstay 104 may also effect the tension in forestay 106. Lengthening backstay 104 may reduce or reverse the rig changes. These changes may create desirable changes in sailshape of either or both of mainsail 126 and jib 128, to adjust the shape of the sails to particular wind or water conditions. However, the effective fore and aft positioning of the mast is not significantly altered by tensioning or releasing the backstay alone. Even if backstay 104 is slacked, sidestays 108 and 110 will tend to keep mast 102 in its position with respect to bow 120 and stern 122.

Adjusters 118 allow sidestays 108 and 110 to be detensioned or slacked as desired while sailing. Slacking the sidestays in conjunction with slacking backstay 104 will permit mast 102 to be raked forward with regard to hull 114. Such a forward racked position may provide a more desirable sailshape for sailing sailboat 100 downwind. So, a crew of sailboat 100 may actuate adjusters 118 when sailboat 100 rounds a windward mark or turning point and bears off to sail to leeward.

Conversely, if mast 102 has been raked forward, for example, for downwind sailing, when sailboat 100 transitions back to a windward course, it may be desirable to rake mast 102 astern toward its original position. Adjusters 118 are configured to permit the crew to rapidly retension or shorten sidestays 108 and 110 when sailboat 100 comes up to a closehauled or windward course at a leeward mark or turning point.

It may also be desirable to adjust the tension of sidestays 108 and 110 while sailing into the wind to permit the shape of sails 126 and 128 to be adapted to the prevailing wind or water conditions. Adding or removing tension from sidestays 108 and 110 may allow the shape of mast 102 and sails 126 and 128 to be more readily or widely adjusted in cooperation with lengthening or shortening other elements of the standing rigging.

Figure 2:
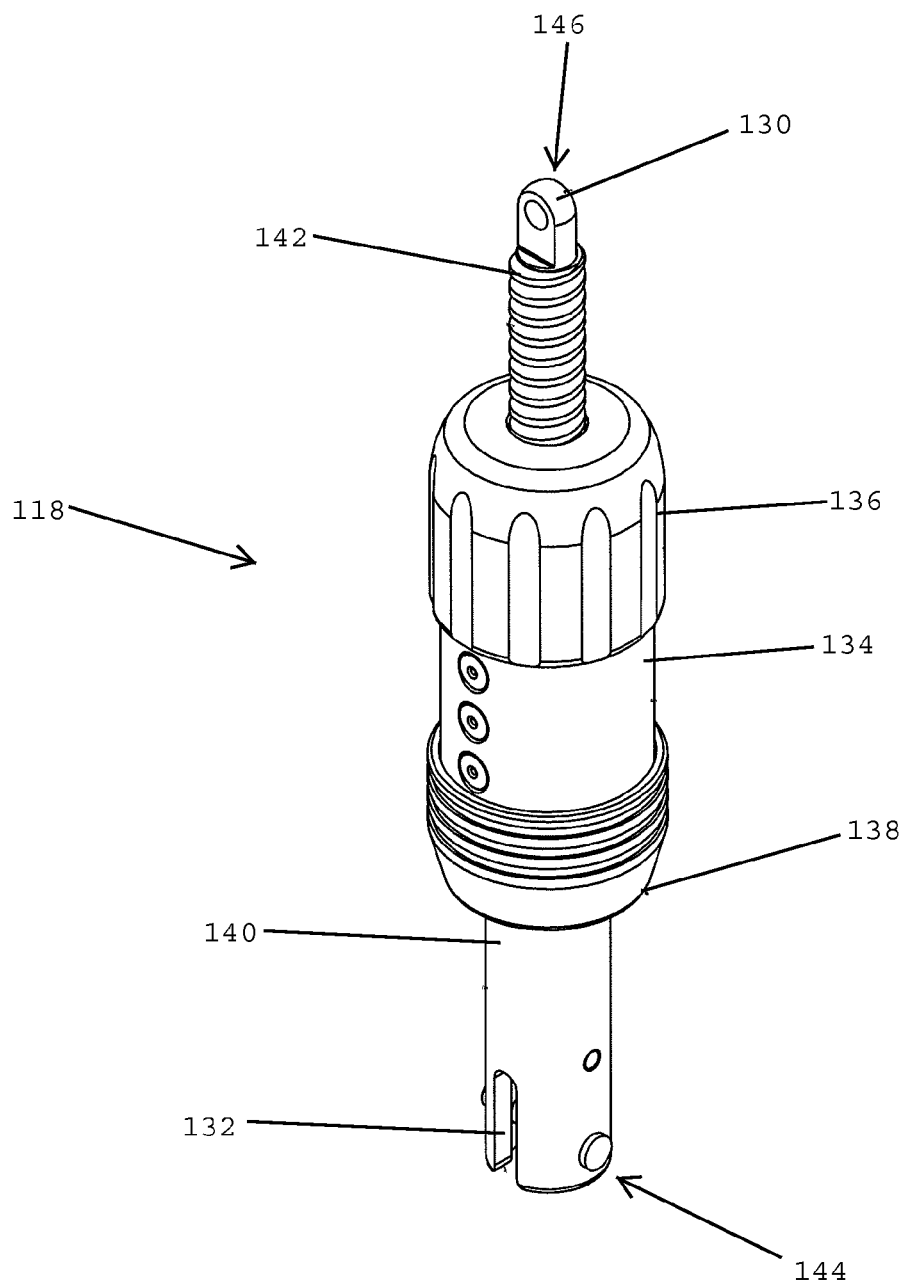
FIG. 2 is a perspective view of the adjuster shown in FIG. 1.
Figure 3:
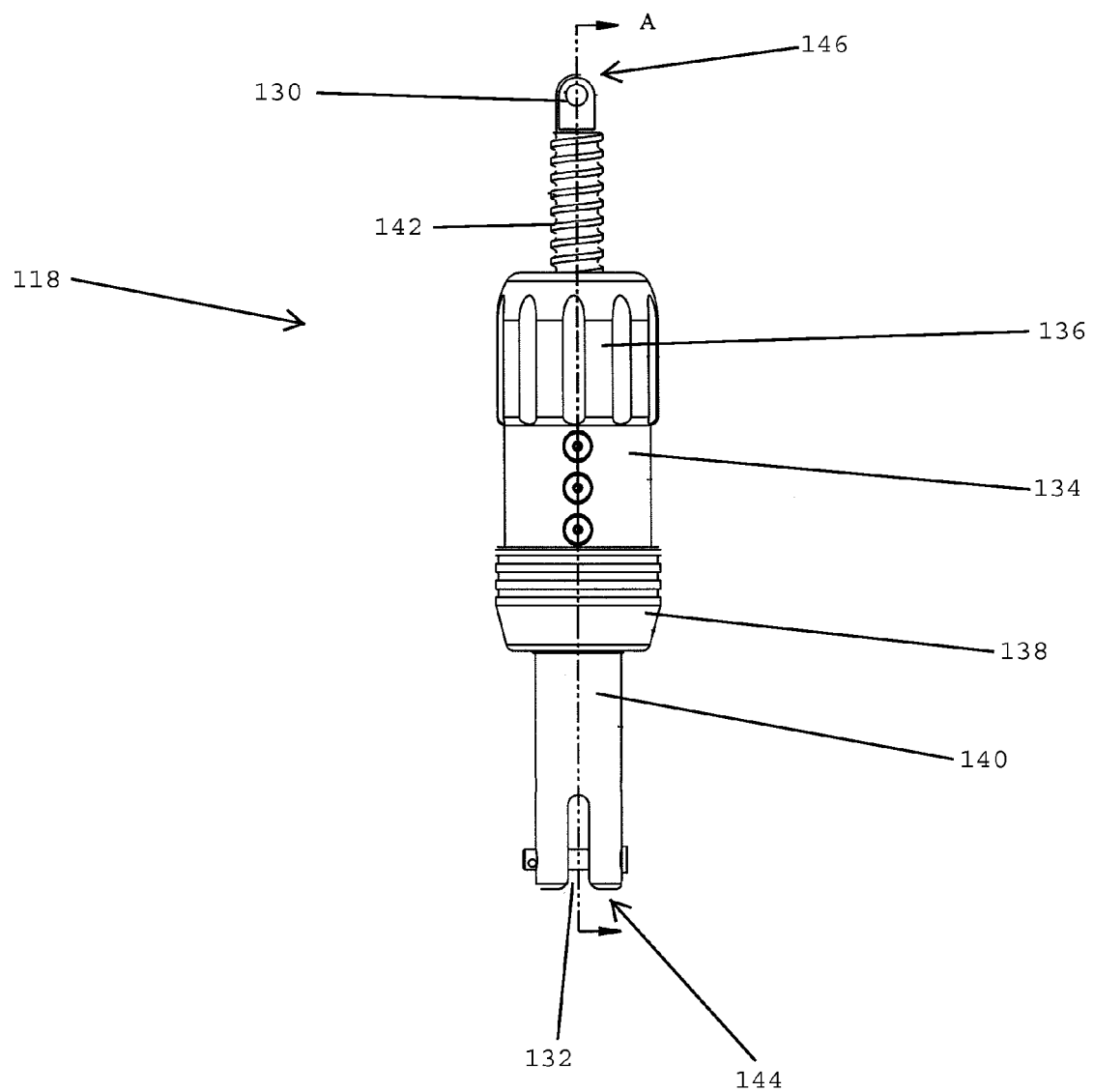
FIG. 3 is a side view of the adjuster of FIG. 2.

FIGS. 2 and 3 show adjuster 118 including an upper connection point 130 for connection to an element of the standing rigging of a sailboat, and a lower connection point 132. A barrel 134 is rotatable about adjuster 118 and an upper grip 136 is mounted or connected to the barrel. A lock 138 is slidably mounted to adjuster 118 and is movable linearly along an axis of the adjuster. A fixed end 144 is defined adjacent lower connection point 132 at a first end of a lower body 140. A movable end 146 is defined adjacent upper connection point 130 at a distal end of a threaded screw or shaft 142.

In operation, lower body 140 and threaded shaft 142 are rotationally fixed relative to each other. Rotating barrel 134 and grip 136 counter clockwise will draw shaft 142 into adjuster 118, moving movable end 146 toward fixed end 144. As shown in FIG. 1, this would shorten the length of sidestay 108 or 110. Lock 138 is spring-biased toward and in engagement with barrel 134. Lock 138 is also rotationally fixed relative to lower body 140. Engagement between lock 138 and barrel 134 permits rotation of barrel 134 to permit controlled movement of movable end 146 while preventing barrel 134 from freewheeling and a rapidly changing the position of movable end 146. Moving lock 138 away from barrel 134 will release the engagement with barrel 134, permitting barrel 134 to freewheel.

As shown in FIG. 1, when adjuster 118 is under a normal of amount of tension to support mast 102, the tension on shaft 142 should be sufficient to induce freewheeling of barrel 134 to move movable end 146 outward when lock 138 is disengaged from barrel 134. Even if barrel 146 is not induced to freewheel by the rig tension, once lock 138 is disengaged, barrel 134 may be rapidly rotated clockwise by hand to lengthen sidestay 108 or 110.

When shortening of sidestay 108 or 110 is desired, barrel 134 is rotated counterclockwise. To aid in this shortening, even as the attached standing rigging is placed under increasing tension by the shortening, barrel 134 is preferably of a large outer diameter. The enlarged diameter provides mechanical advantage for a crew member rotating the barrel by hand.

Referring now to FIG. 3, lower body 140 includes a first end 150 and an upper end 152 and is substantially hollow. Shaft 142 includes a first end 154 and a second end 156 slidably received within lower body 140. A transverse pin 164 extends through shaft 142 adjacent second end 156 and engages lower body 140. Pin 164 permits shaft 142 and lower body 140 to slide axially with respect to each other while fixing the rotationally with respect to each other.

Within upper grip 136 is a ball nut 158 within which shaft 142 is rotatably received. Ball nut 158 is fixed to barrel 134 and rotates with barrel 134 and grip 136. At least one and preferably a plurality of spring-loaded detents 160 are positioned between lock 138 and barrel 134. As shown in FIG. 3, detents 160 may be mounted within or part of lock 138 and are received within recesses formed in barrel 134. Alternatively, barrel 134 may be adapted to include detents engaging recesses of lock 138. A plurality of ball bearings 162 are positioned between lower body 140 and barrel 134 to provide smooth rotation of barrel 134 about lower body 140.

A lower washer 166 may be positioned about lower body 140 to provide a shoulder or stop for lock 138. A spring or wave washer 168 may be positioned between washer 166 and lock 138 to urge lock 138 into engagement of barrel 134. Lock 138 may be slid toward end 150 of lower body 140 to disengage barrel 134 and lock 138 and permit freewheeling of barrel 134 about adjuster 118. When lock 138 is released, spring 168 would urge lock 138 (and detents 160) back into engagement with barrel 134.

Referring now FIGS. 5 to 10, lower body 140 may includes a circumferential groove 170 to aid in positioning and securing washer 166. An opening 172 may be including to cooperate with a slot 176 permitting adjuster 118 to be connecting to a deck or hull fitting such as a tab of a chainplate. A plurality of bearing races 174 may be defined about the lower body adjacent upper end 152 to receive ball bearings 162. An opening 178 may be defined substantially from end-to-end of lower body 140 and sized to receive and generally closely match the size of shaft 142. A pair of opposing grooves 180 within opening 178 may be defined parallel to opening 178 and sized to receive transverse pin 164.

Referring now to FIGS. 11 to 14, an assembly of shaft 142 and ball nut 158 includes a pin opening 182 adjacent second end 156 to permit insertion of transverse pin 164. Ball nut 158 includes a connection portion 184 configured to fit within and engage a portion of barrel 134. This engagement permits ball nut 158 and barrel 134 to be rotationally fixed to each other. A recirculation path 186 may be provided in ball nut 158.

Referring now to FIGS. 16 to 19, shaft 142 which is also a ball screw as shown, includes a continual spiral running from end to end. This spiral defines adjacent lands 188 and grooves 190 between adjacent lands. Grooves 190 are sized to receive ball bearings within ball nut 158, as opposed to a conventional screw and nut with matching threadings. The use of balls within ball nut 158 to engage screw or shaft 142 provides for less friction and greater ease of movement of the nut relative to the screw. Because of this reduced friction, and in cooperation with the diameter of barrel 134 providing mechanical advantage to a crew member, the advance of the threading of shaft 142 may be made greater than a conventional turnbuckle. Advance is defined is the distance between adjacent lands when viewed from the side, as indicated by 192 in FIG. 16, and is the distance nut 158 with move axially along shaft 142 when rotated one full revolution.

As an example, a conventional turnbuckle sized for up to an approximately 5/16 inch wire shroud may include threading with an advance of approximately 0.05 inches per revolution. This based on the expected maximum tension that can be placed on the shroud and the diameter of the nut assembly available to rotate the nut relative to the screw. An adjuster according to the present disclosure and sized for up to the same wire size may include an advance of approximately 0.20 inches per revolution. This permits more rapid movement of the movable end of the adjuster when the barrel is turned and also may promote freewheeling of the barrel when the lock is disengaged.

FIGS. 20 to 23 show ball nut 158 with recirculation path 186. A central opening 196 is defined to receive shaft 142 with a plurality balls 194 positioned within opening 196 to engage lands 188 and grooves 190. A spiral path is defined on an outer wall within opening 196 for balls 194 to circulate as shaft 142 is rotated relative to ball nut 158. The spiral path within opening 196 is matched to the spiral defined by the threading of shaft 142 and has terminations at either end which are connected with recirculation path 186. Recirculation path 186 is a hollow tube which provides a path for balls exiting the spiral at one end to recirculate back to the other end and reenter the spiral path.

Referring now to FIGS. 24 to 31, barrel 134 includes a gripping surface 198 and a connection surface 200 configured to connect with upper grip 136. An opening 202 is defined through barrel 134 and within opening 202 is a connecting surface 204 configured to connect with connection portion 184 of ball nut 158. A plurality of opening 206 are provided into bearing races 208. Opening 202 adjacent bearing races 208 is sized to fit about lower body 140. Bearing races 208 are sized and positioned to cooperate with races 174 of lower body 140. Openings 206 permit bearings to be inserted or removed from races 208 (and races 174) when adjuster 118 is assembled, and also permit bearings within these races to be cleaned and lubricated without disassembling adjuster 118. Barrel 134 may also include a plurality of recesses 210 configured to receive and engage detents of lock 138.

FIGS. 32 to 37 illustrate upper grip 136 with an outer gripping surface 214 in which may be formed a plurality of grooves 216 or other grip enhancing features. Other grip enhancers might include a dimpled finish over the outer surface, a non-skid surface treatment or other similar features which might be used in conjunction with or instead of the grooves. A smaller opening 212 in a first or upper end allows threaded shaft 142 to extend through grip 136. A larger opening 220 in a second or lower end permits entry of an upper portion of barrel 134. An inner surface 218 within grip 136 adjacent to opening 220 provides a connection surface for mating grip 136 to barrel 134 to securely fix the two elements rotationally to each other. So fixed to each other, the crew may grip one or both of the grip 136 or the barrel 134 to actuate adjuster 118. An interior space 222 is defined within grip 136 within which an upper portion of ball nut 158 extends.

Referring now to FIGS. 38 to 43, lock 138 includes an outer surface 224 on which may be formed a plurality of grooves 226 to enhance grip. As opposed to barrel 134 and grip 136, which are rotated to actuate adjuster 118, lock 138 is moved axially with regard to the adjuster to release or engage the detents. As such, grooves 226 or other grip enhancing features on outer surface 224 are preferably placed transverse to the gripping features of barrel 134 or grip 136.

Figure 4:
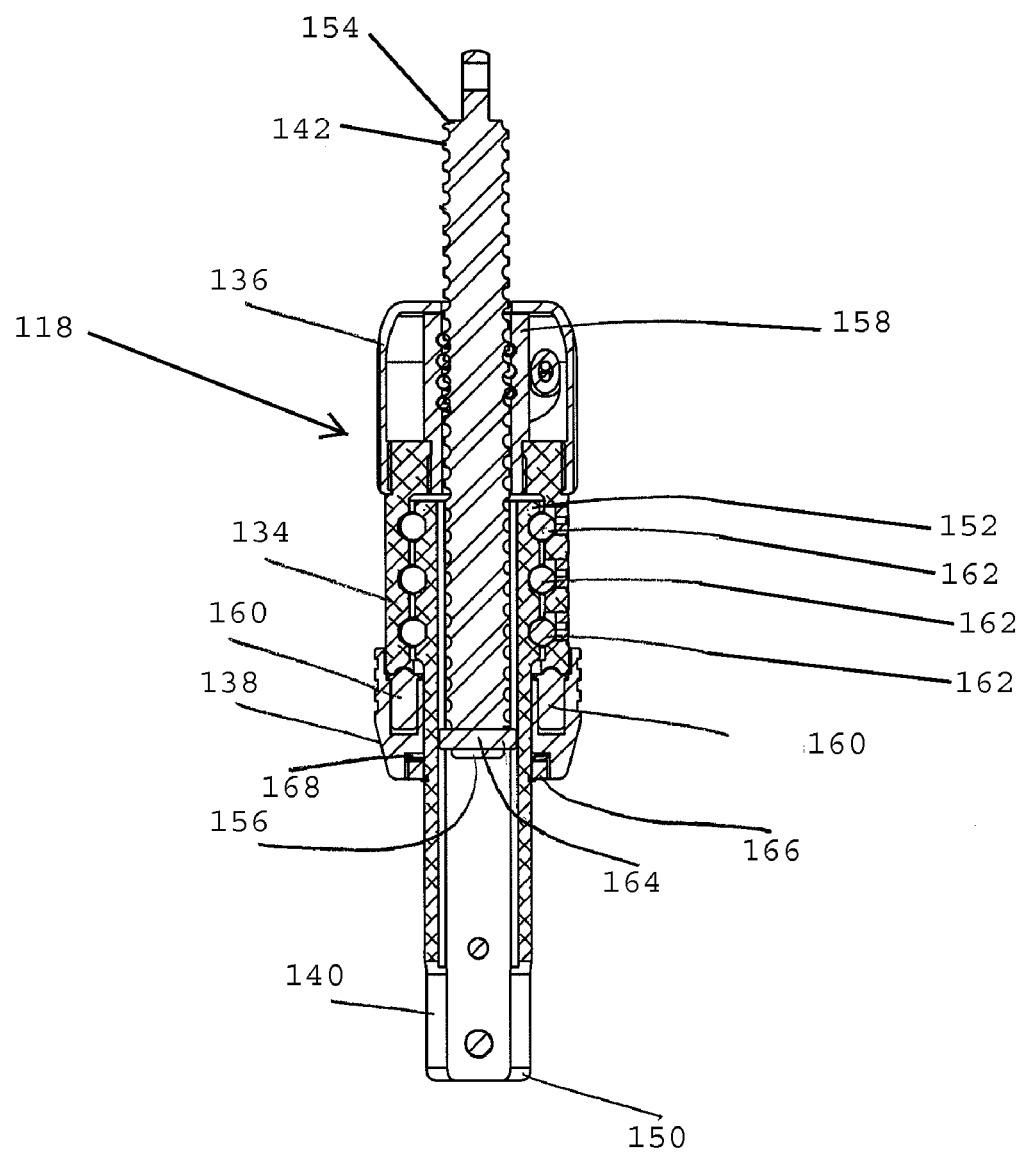
FIG. 4 is a side cross-sectional view of the adjuster in FIG. 2, taken along A-A in FIG. 3.
Figure 20:
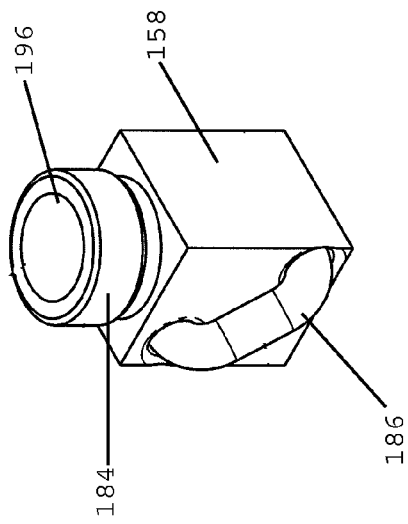
FIG. 20 is a perspective view of the ball nut of the assembly of FIG. 11.
Figure 21:
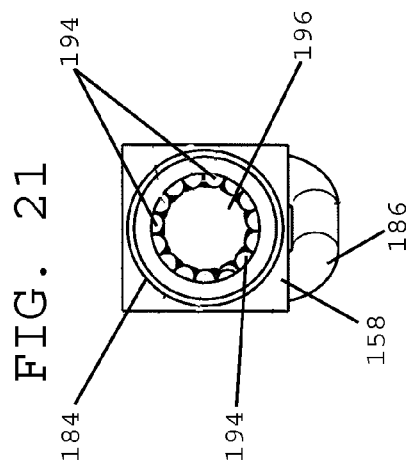
FIG. 21 is an end view of the ball nut of FIG. 20.
Figure 22:
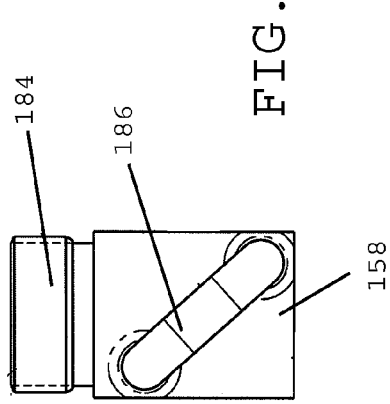
FIG. 22 is a first side view of the ball nut of FIG. 20.
Figure 23:
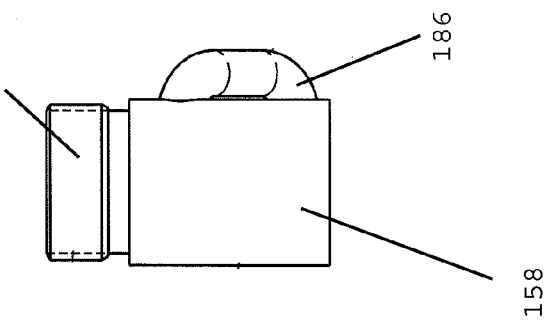
FIG. 23 is a second side view of the ball nut of FIG. 20.

Within a central opening 240 defined through lock 138 are three distinct areas of different diameter. A first area 228 is sized to fit over a lower portion of barrel 134 while not impeding rotation of barrel 134. A shoulder 229 is defined within central opening 240 to transition between first area 228 and second area 232. On shoulder 229 are a pair of openings 230 to receive detents 160 as shown in FIG. 4. Detents 160 are preferably spring loaded ball units that are seated within openings 230 with the ball protruding above shoulder 229 to engage openings 210 of barrel 134. Second area 232 is sized to fit closely about lower body 140. Within second area 232 are formed in an inner wall 242 a pair of recesses 234. In recesses 234, a ball or other bearing material or feature may be positioned that will slidably engage an outer surface of lower body 140 to prevent binding of lock 138 on the outer surface and aid in movement of lock 138 along lower body 140 with respect to barrel 134.

A third portion 236 defines a greater diameter than second portion 232 and a second shoulder 238 is formed in the transition between the two areas. Area 236 provides a space for lower washer 166 to be received and shoulder 238 provides a surface of lock 138 for spring 168 to push against to urge lock 138 into engagement with barrel 134.

As shown and described herein, adjuster 118 is configured to allow for the rapid release of tension and/or lengthening of elements of the standing rigging of sailboat 100. Adjuster 118 further provides for mechanical advantage in the retensioning or shortening of the element. It is anticipated that such an adjuster may be used for other applications in sailboat 100 where similar rapid movement is desired. For example, adjuster 100 may be used to reposition a mast step fore or aft to alter the position of the rigging of sailboat 100. Such a mast step adjustment may be mounted within hull 114 for a hull stepped mast or mounted to the deck for a deck stepped mast. An adjuster according to the present disclosure may also be used to adjust a mast partner engaging the mast above the mast step, such as at deck 116. Adjustment of the partner may permit the position of the rigging to be altered with respect to hull 114 or the permit the bending characteristics of mast 102 to be altered to suit particular wind or water conditions. Such alternative configurations are illustrated in FIG. 44.

As adjuster 118 is configured for manual operation, and permits rapid movement of the desired control by a crew member without having the crew member out of an ordinary sailing position, it is preferable that adjuster 118 be positioned adjacent to or within cockpit 115 of sailboat 100. If adjuster 118 might be configured to remote actuation, then adjuster 118 might be mounted in any number of other locations within hull 114 without regard to normal crew positions.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A linear adjustment device for a sailboat, the linear device comprising:
    a hollow lower body with a first fixed end extending from a lower end of the device and defining a first attachment point, and an upper end;
    a threaded ball screw with a first moveable end extending opposite the lower body and defining a second attachment point, and a second end slidably received within the lower body through the upper end of the lower body, the ball screw and the lower body engaging each other to prevent rotation with respect to each other;
    a recirculating ball nut including an opening sized to receive the ball screw and including a plurality of balls held within races on an interior wall of the opening to engage the threads of the ball screw, the ball nut positioned about the ball screw between the first moveable end of the ball screw and the upper end of the lower body;
    a barrel positioned about and rotational fixed to the ball screw, the barrel also positioned about and rotatable with respect to the lower body;
    a sliding sleeve positioned about the lower body and rotationally fixed to the lower body, the sleeve movable between a first position where the sleeve releasably engages with and impedes free rotation of the barrel about the lower body, and a second position where the sleeve is disengaged from the barrel and the barrel is free to rotate about the lower body;
    wherein when the sleeve is in the first position, the engagement of the sleeve and the barrel prevents tension applied to the adjuster on the fixed and movable ends from urging the barrel to rotate about the lower body by engagement and cooperation of the balls and the threads, and the engagement of the sleeve and barrel permit force applied to the barrel to rotate the barrel about the lower body, permitting the first and second attachment points to be moved closer or further from each other;
    wherein when the sleeve is in the second position, tension applied to the adjuster is sufficient to urge the barrel to rotate about the lower body and permits the second attachment point to be pulled away from the first attachment point.

2. The linear adjustment device of claim 1, wherein the device is positioned to adjust the position of a mast of the sailboat with respect to a hull of the sailboat.

3. The linear adjustment device of claim 2, further comprising the device is positioned between a tensioned support member of the mast of the sailboat and the hull of the sailboat.

4. The linear adjustment device of claim 2, further comprising the device positioned between the hull and the mast of the sailboat.

5. The linear adjusting device of claim 2, further comprising an upper grip positioned about the ball nut and rotationally fixed to the barrel.

* * * * *